(12) United States Patent
Wu et al.

(10) Patent No.: US 8,681,582 B2
(45) Date of Patent: Mar. 25, 2014

(54) METHOD FOR SONIC INDICATION OF FORMATION POROSITY AND LITHOLOGY

(75) Inventors: Peter T. Wu, Missouri City, TX (US); Alain Dumont, Kawasaki (JP); Pierre Campanac, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1415 days.

(21) Appl. No.: 11/964,734

(22) Filed: Dec. 27, 2007

(65) Prior Publication Data

US 2009/0168596 A1 Jul. 2, 2009

(51) Int. Cl.
*G01V 1/40* (2006.01)

(52) U.S. Cl.
USPC ................................. 367/35; 367/25; 367/14

(58) Field of Classification Search
USPC ...................... 181/105; 367/26, 29–32, 35, 47
See application file for complete search history.

(56) References Cited

U.S. PATENT DOCUMENTS

| 4,354,381 | A | | 10/1982 | Medlin et al. | |
|---|---|---|---|---|---|
| 4,449,208 | A | * | 5/1984 | Moeckel et al. | 367/30 |
| 4,594,691 | A | * | 6/1986 | Kimball et al. | 367/32 |
| 5,278,805 | A | | 1/1994 | Kimball | |
| 6,374,185 | B1 | | 4/2002 | Taner et al. | |
| 2003/0058739 | A1 | | 3/2003 | Hsu et al. | |
| 2006/0083108 | A1 | * | 4/2006 | Wu | 367/31 |
| 2006/0120217 | A1 | | 6/2006 | Wu et al. | |
| 2006/0233048 | A1 | * | 10/2006 | Froelich et al. | 367/35 |

FOREIGN PATENT DOCUMENTS

WO WO 2005/052639 A1 6/2005

OTHER PUBLICATIONS

Klimentos et al., "Relationships among compressional wave attenuation, porosity, clay content, and permeability in sandstones," Geophysics, vol. 55, No. 8, Aug. 1990, pp. 998-1014.*
Leiphart et al., "Case History: Comparison of linear regression and a probabilistic neural network to predict porosity from 3-D seismic attributes in Lower Brushy Canyon channeled sandstones, southeast New Mexico," Geophysics, vol. 66, No. 5, Sep.-Oct. 2001, pp. 1349-1358.*
Rosenbaum, "Synthetic Microseismograms: Logging in Porous Formations", Geophysics, vol. 39, No. 1, (Feb. 1974).
Kimball et al. "Semblance Processing of Borehole Acoustic Array Data," Geophysics, vol. 49, No. 3 (Mar. 1984).
Daniel J. Leiphart, Bruce S. Hart, "Case History—Comparison of linear regression and a probabilistic neural network to predict porosity from 3-D seismic attributes in Lower Brushy Canyon channeled sandstones, southeast New Mexico", Geophysics vol. 66, No. 5, Sep. 2001-Oct. 2001, pp. 1349-1358.
Satinder Chopra, Arcis Corporation, Calgary, Canada, Kurt J. Marfurt, University of Houston, USA, "Volumetric curvature attributes add value to 3D seismic data interpretation", Leading Edge, the, Society of Exploration Geophysicists, Tulsa, OK, US, vol. 26, No. 7, Jul. 1, 2007, pp. 856-858, 860, 861, 863.

(Continued)

*Primary Examiner* — Isam Alsomiri
*Assistant Examiner* — Daniel L Murphy
(74) *Attorney, Agent, or Firm* — Daryl Wright; Brigitte L. Echols (57) ABSTRACT

A method for estimating formation porosity and lithology on a real time basis during a logging while drilling operation using measured values of formation attenuation attributes for compression and/or shear.

10 Claims, 5 Drawing Sheets

(56) References Cited

OTHER PUBLICATIONS

Kurt J. Marfurt, R. Lynn Kirlin, Steven L. Farmer, Michael S. Bahorich, "3-D seismic attributes using a semblance-based coherency algorithm", Geophysics vol. 63, No. 4, Jul.-Aug. 1998, p. 1150-1165.

T. Klimentos, C. McCann, "Relationships among compressional wave attenuation, porosity, clay content, and permeability in sandstones", Geophysics, vol. 55, No. 8. Aug. 1990, pp. 998-1014.

Wyllie, M. R. J., Gregory, A. R., and Gardner, L. W., "Elastic Wave Velocities in Heterogeneous and Porous Media" Geophysics, vol. 21, No. 1, Jan. 1956, pp. 41-70.

Raymer, L. L, Hunt, E. R., and Gardner, J. S., 1980, "An Improved Sonic Transit-Time-To-Porosity Transform" SPWLA, 21st Annual Logging Symposium. Jul. 8-11, 1980, 13 page.

Theodoros Klimentos, "Attenuation of P- and S-waves as a method of distinguishing gas and condensate from oil and water", Geophysics, vol. 60, No. 2 (Mar.-Apr. 1995); P. 447-458, 13 Figs.

A. Brie, F. Pampuri, A.F. Marsala, O. Meazza "Shear Sonic Interpretation in Gas-Bearing Sands", SPE 30595, Copyright 1995, Society of Petroleum Engineers, Inc., SPE Annual Technical Conference & Exhibition held in Dallas, U. S.A., Oct. 22-25, 1995.

Chuen Hon Cheng, M. Nafi Toksoz, and Mark E. Willis, "Determination of In Situ Attenuation From Full Waveform Acoustic Logs", Journal of Geophysical Research, vol. 87, No. B7, pp. 5477-5484, Jul. 10, 1982.

Jennifer Market, Craig Barnett, Ron Deady, Gary Althoff Sperry "New Processing Techniques to Meet Challenges of LWD Acoustic Logging", SPE 71731, Copyright 2001, Society of Petroleum Engineers Inc., 2001 SPE Annual Technical Conference and Exhibition held in New Orleans, Louisiana, Sep. 30-Oct. 3, 2001.

Brian E. Hornby and Eric S. Pasternack, "Analysis of Full-Waveform Sonic Data Acquired in Unconsolidated Gas Sands", Petrophysics, vol. 41., No. 5 (Sep.-Oct. 2000); p. 363-374; 13 Figures.

T. Klimentos, "Petrophysics and Seismic Wave Technology: Applications in Exploration, Formation Evaluation, and Reservoir Characterization" SPE 29887, Copyright 1995, Society of Petroleum Engineers, Inc, SPE Middle East Oil Show held in Bahrain, Mar. 11-14, 1995.

Z. Liu & J. W. Rector, K.T. Nihei, L. Tomutsa, L. R. Myer & S. Nakagawa, "Extensional wave attenuation and velocity in partially-saturated sand in the sonic frequency range", Rock Mechanics in the National Interest, Elsworth, Tinucci Heasley(eds), © 2001 Swets & Zeitlinger Lisse, ISBN 90 2651 827 7.

William Murphy, Andrew Reischer, and Kai Hsu, "Modulus decomposition of compressional and shear velocities in sand bodies", Geophysics, vol. 58, No. 2 (Feb. 1993), p. 227-239, 13 Figs.

Azra N. Tutuncu, Augusto L. Podio, and Mukul M. Sharma, "An experimental investigation of factors influencing compressional- and shear-wave velocities and attenuations in tight gas sandstones", Geophysics, vol. 59, No. 1 (Jan. 1994); p. 77-86, 15 Figs., 1 Table.

Kenneth W. Winkler, "Estimates of velocity dispersion between seismic and ultrasonic frequencies", Geophysics, vol. 51, No. 1(Jan. 1986); p. 183-189, 8 Figs., 1Table.

\* cited by examiner

METHOD FOR SONIC INDICATION OF FORMATION POROSITY AND LITHOLOGY

TECHNICAL FIELD

This invention relates to monopole wireline and monopole, dipole and quadrupole drill string logging-while-drilling measurement of sonic wave component attributes and use of that information for determining lithology, porosity and saturation as seen by acoustic waves. More specifically, the invention includes sonic attenuation cross plots as a complement to existing delta-t cross plots and a more sensitive indication of lithology, porosity and saturation.

BACKGROUND OF THE INVENTION

In the oil and gas industry acoustic tools are used to provide operationally significant information about borehole and formation attributes adjacent the tools such as compressional, shear and Stoneley slowness. These attributes are analyzed for determining, inter alia, the rate of flow of a hydrocarbon (gas or oil) out of a producing borehole in the hydrocarbon production industry. This critical information fundamentally depends on permeability of the formation, viscosity of the hydrocarbon and the existence of fractures. Collecting and recording this information on a delayed or real time basis is known as well logging.

Evaluation of physical properties such as pressure, temperature and wellbore trajectory in three-dimensional space and other borehole characteristics while extending a wellbore is known as measurements-while-drilling (MWD) and is standard practice in many drilling operations. MWD tools that measure formation parameters such as resistivity, porosity, sonic velocity, gamma ray, etc. of a formation are known as logging-while-drilling (LWD) tools.

For the above and other reasons, the oil industry has developed acoustic well logging techniques that involve placing an acoustic tool within a well bore to make measurements indicative of formation attributes such as compressional slowness (DTc), shear slowness (DTs) and Stoneley slowness (DTst). Sonic logs can be used as direct indications of subsurface properties and in combination with other logs and knowledge of subsurface properties can be used to determine subsurface parameters, such as those related to borehole structure stability, that can not be measured directly. Early efforts in this connection were reported by Rosenbaum in "Synthetic Microseismograms: Logging in Porous Formations", *Geophysics*, Vol. 39, No. 1, (February 1974) the disclosure of which is incorporated by reference as though set forth at length.

Acoustic logging tools typically include a transmitter and an array of axially spaced acoustic detectors or receivers. These tools are operable to detect, as examples, formation compressional waves (P), formation shear waves (S) and Stoneley waves. These measurements can be performed following drilling or intermediate drill string trips by wireline logging operations. In wireline logging, sonic monopole tools can be used to measure compression waves (P) and shear waves (S) in fast formations. In addition to wireline logging, techniques have been developed where piezoelectric transmitters and hydrophone receivers are imbedded within the walls of drill string segments so that sonic LWD operations can be performed.

Early LWD and sonic data processing techniques developed by the Schlumberger Technology Corporation such as a slowness-time-coherence (STC) method is disclosed in U.S. Pat. No. 4,594,691 to Kimball et al. entitled "Sonic Well Logging" as well as in Kimball et al. "Semblance Processing of Borehole Acoustic Array Data," *Geophysics*, Vol. 49, No. 3 (March 1984). This method is most useful for non-dispersive waveforms (e.g. monopole compressional and shear head waves). For processing dispersive waveforms a slowness-time-coherence (DSTC) is preferred. This process is disclosed in U.S. Pat. No. 5,278,805 to Kimball entitled "Sonic Well Logging Methods and Apparatus Utilizing Dispersive Wave Processing." The disclosures of these patents, of common assignment with the subject application, as well as the noted *Geophysics* publication authored by an employee of Schlumberger are hereby also incorporated by reference.

Sonic wireline tools, such as a Dipole Shear Sonic Imager (DSI—trademark of Schlumberger) and Schlumberger's Sonic Scanner generally have a multi-pole source. A multi-pole source may include monopole, dipole and quadrupole modes of excitation. The monopole mode of excitation is used traditionally to generate compressional and shear head waves such that formation compressional and shear slowness logs can be obtained by processing the head wave components. The head wave components are non-dispersive and are generally processed by slowness-time-coherence (STC) methods as discussed in the Schlumberger Kimball et al. '691 patent and Vol. 49 *Geophysics* article noted above.

The slowness-time-coherence (STC) method is employed to process the monopole wireline or LWD sonic waveform signals for coherent arrivals, including the formation compressional, shear and borehole Stoneley waves. This method systematically computes the coherence (C) of the signals in time windows which start at a given time (T) and have a given window move-out slowness (S) across the array. The 2D plane C(S, T) is called the slowness-time-plane (STP). All the coherent arrivals in the waveform will show up in the STP as prominent coherent peaks. The compressional, shear and Stoneley slowness (DTc, DTs, and DTst) will be derived from the attributes of these coherent peaks.

Traditionally, the attributes associated with the wave components found in the STP are the slowness, time and the peak coherence values. These three attributes are used in a labeling algorithm, discussed below, to determine the compressional, shear and Stoneley slowness from all of the STP peak candidates. These attributes can also be used for quality control purposes.

Although determining traditional attributes has been highly effective in the past a need exists for enhancing information by expanding wave component attributes to include attributes of slowness, time, coherence, coherent energy, attenuation and instantaneous frequency. The subject invention expands the wave component attributes to include compression and shear attenuation attributes for use in indicating lithology, porosity and saturation of a formation.

SUMMARY OF THE INVENTION

The subject invention exploits the attenuation attributes of the compressional and shear waves (ATTc and ATTs) to obtain porosity, lithology, and saturation information about the formation. The invention develops: (1) an empirical relationship between porosity $\Phi$ and the attenuation attribute of the compressional wave ATTc, and (2) an empirical lithology map with ATTc plotted on the x-axis and the ratio of the attenuation attributes ATTs/ATTc plotted on the y-axis. Measurements of ATTc obtained during logging while drilling (LWD) operations are used with the empirical relationship between $\Phi$ and ATTc to estimate porosity. Measurements of ATTc and ATTs obtained during LWD operations are used with the empirical lithology map to determine lithology, porosity, and saturation of the formation when these are unknown.

THE DRAWINGS

Other aspects of the present invention will become apparent from the following detailed description of embodiments taken in conjunction with the accompanying drawings wherein.

DETAILED DESCRIPTION

Turning now to the drawings wherein like numerals indicate like parts, the subject invention is directed to the concept of using the attenuation attributes of sonic waves generated during logging while drilling operations to determine lithology, porosity and saturation of the formation.
Context of the Invention FIG. 1 discloses a drilling derrick 100 positioned over a well hole 102 being drilled into an earth formation 104. The drilling derrick has the usual accompaniment of drilling equipment including a processor 106 and recorder 108 of the type used for measurements while drilling (MWD) or logging while drilling (LWD) operations. A more detailed disclosure of conventional drilling equipment of the type envisioned here is described in Schlumberger's Wu et al published application No. 2006/0120217 the disclosure of which is incorporated by reference as though set forth at length.

Figures 1, 2A:
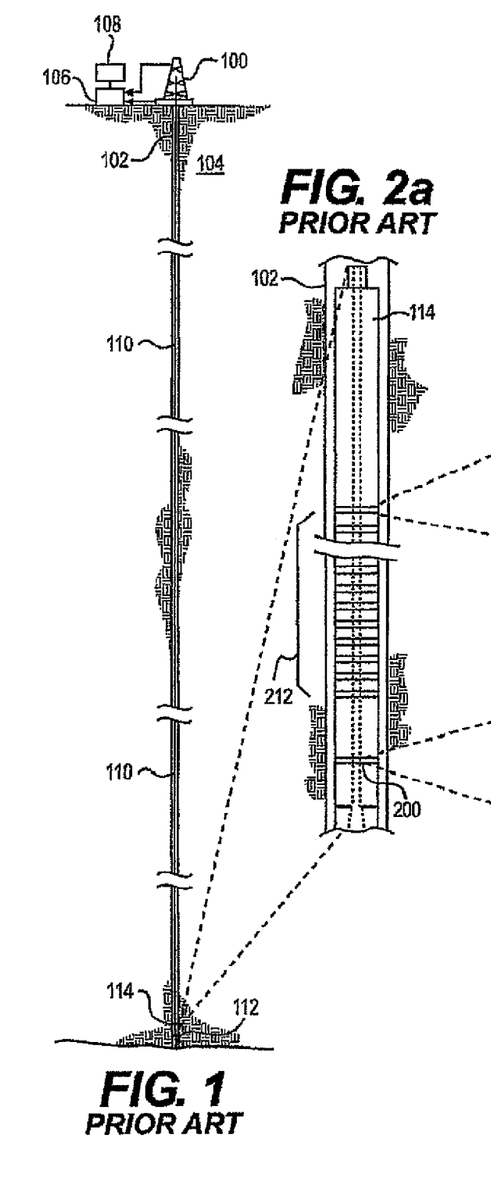
FIG. 1 is a schematic of a typical derrick and a logging while drilling (LWD) system where a drill string is positioned within a borehole and a well logging segment near a drill bit is shown within the borehole.
FIG. 2*a* is an enlarged diagram of a logging while drilling tool taken at a location above a drill bit within the borehole of FIG. 1.

The borehole is formed by a drill string 110 carrying a drill bit 112 at its distal end. The drill bit crushes its way through earth formations as the drill string is rotated by drilling equipment within the drilling derrick. The depth of a well will vary but may be as much at 25,000 feet or more in depth.

Figure 2B:
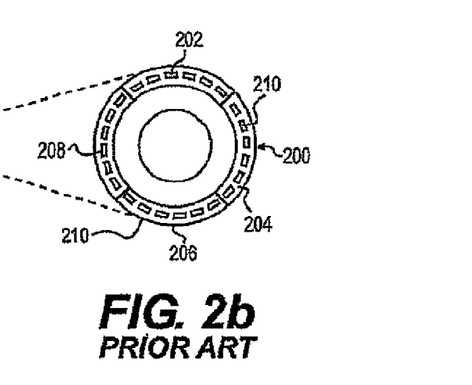
FIG. 2*b* is a schematic cross-sectional view of a quadrupole sonic transmitter taken from the LWD segment shown in FIG. 2*a*.
Figure 2C:
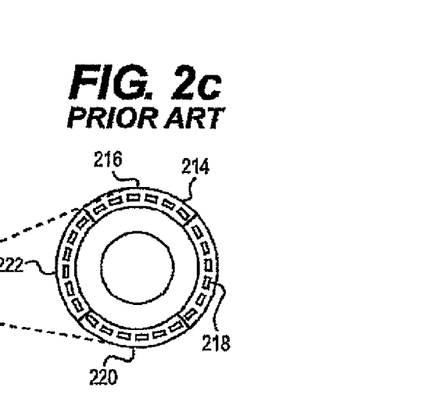
FIG. 2*c* is a schematic cross-sectional view of a quadrupole receiver from a stack of receivers of the LWD tool shown in FIG. 2*a*.

Turning to FIGS. 2*a*-2*c* a quadrupole acoustic shear wave LWD tool segment 114 is shown in a degree of schematic detail. A more detailed discussion of a LWD tool of this type can be seen in Hsu et al. Publication No. US 2003/0058739 of common assignment with the subject application. The disclosure of this entire publication is incorporated by reference here. Briefly, however, the quadrupole LWD tool segment 114 includes at least one transmitter ring 200 and an array of receivers 212.

FIG. 2*b* illustrates a transmitter 200 divided into four quadrants 202, 204, 206 and 208. Each quadrant contains a quarter-circle array of piezoelectric transducer elements 210. FIG. 2*b* shows six piezoelectric transducer elements in each quadrant although in some embodiments nine elements may be preferred uniformly spaced around the azimuth.

As noted above an array of quadrupole receivers 212 is shown in FIG. 2*a* embedded within the side wall of drill pipe segment 114. These receivers are spaced vertically and may be five to fifty or more in a vertical array. The receivers are similar to the transmitter in that each receiver 214 of receiver array 212 has a quarter circle of piezoelectric transducer elements in each of quadrants 216, 218, 220 and 222 as shown in FIG. 2*c*. Each ring transducer is capable of detecting a quadrupole shear wave refracted through a formation as discussed more fully in the above referenced Hsu et al publication US 2003/0058739.

Figure 3:
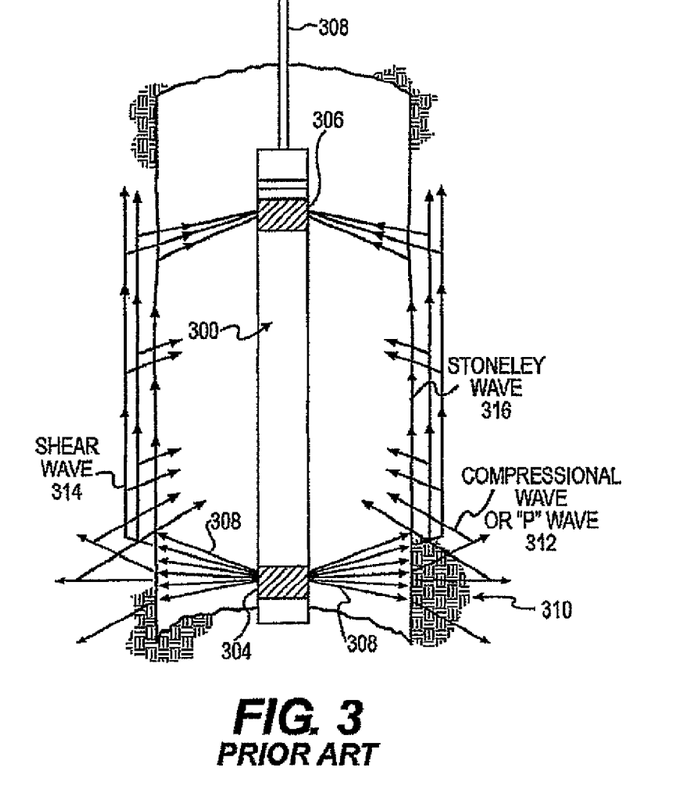
FIG. 3 is a schematic diagram disclosing traditional sonic wave technology including a representative transmitter, receiver and compressional waves, shear waves and Stoneley sonic waves.

While FIGS. 1-2 schematically disclose a LWD system where sonic transmitters and receivers are embedded within the side walls of a drill string near the drilling bit, FIG. 3 disclosed a wireline tool or sonde 300 which is lowered down a borehole suspended by a wireline 302 following a drill string tripping operation or subsequent logging following drilling operations. The sonde carries a transmitter 304 and an array of receivers 306 similar to the LWD tool discussed in connection with FIGS. 1 and 2. In this the transmitting component 304 sends sonic waves 308 into the surrounding earth formation 310 and compressional or "P" waves 312, shear or "S" waves 314 and Stoneley or tube waves 316 (that are propagated along the interface between a formation and the borehole fluid) are received by an array of the receiver components 306 as illustrated in FIGS. 2*a*-2*c* above.

Measurement of arrivals of these waveforms will show up in a slowness-time plane (STP) as prominent coherent peaks. The compressional, shear and Stoneley slowness (DTc, DTs and DTst) are derived from the attributes of these coherent peaks. Although DTc and DTs are known to be useful in determining formation lithology, porosity and saturation, the subject invention measures other wave component attributes to include compression and shear attenuation (ATTc and ATTs respectively) and exploits the use of these attributes in determining formation porosity, lithology and saturation.
Compression and Shear Attenuation Attributes In order to compute attenuation, the total energy received within a specified time window at the kth receiver, TE(k), is determined. Receivers are numbered from 1 to n (=number of receivers), with the 1st receiver being the receiver closest to the transmitter. TE(k) will decrease or attenuate with increasing k, or as the distance TR(k) from the transmitter to the receiver increases. The attenuation attribute for the casing wave (ATTca) for a given time frame is computed by applying the well known linear least square fit algorithm to the data set $\{(TR(k), TE(k)), k=1, 2, \ldots, n=\text{number of receivers}\}$. The slope of the line that is fitted to this data will be negative. The absolute value of the slope is defined to be the attenuation (ATT); ATTc and ATTs are the attenuations associated with the compressional and shear waves respectively. Both depend on the depth or time frame of the measurement. Increased porosity normally correlates with increased attenuation.

Figure 4:
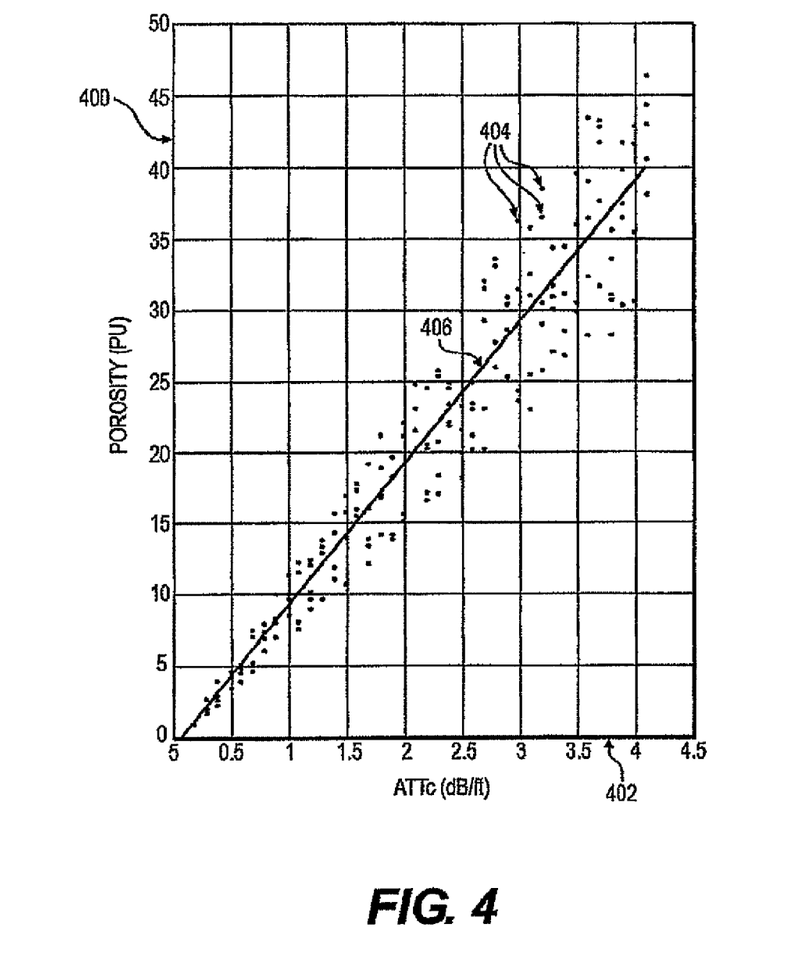
FIG. 4 is an example of an empirical cross plot of compression wave attenuation ATTc versus porosity $\Phi$ for water bearing sandstone.

FIG. 4 illustrates a cross plot of porosity Φ 400 versus the attenuation of the compressional wave ATTc 402 over a wide range of reservoir rock with different porosities. The plot may be constructed with global data taken from various locations or with localized data, as appropriate to the intended application. Global data would be most suitable for an unknown exploratory field; if localized data is available for the drill site area, it would be more suitable to use that data.

The scattered data points 404 in FIG. 4 are obtained from field data and, despite the variability of this experimental data, the trend of porosity to increase with increasing compressional attenuation is clearly visible. Furthermore, in FIG. 4, the prevailing trend appears to be linear in nature so that the empirical relationship between compressional wave attenuation and porosity is represented by a straight line 406. The empirical relationship between compressional wave attenuation and porosity can be established from the collected data points by various curve fitting algorithms. The least squares linear fit algorithm was used in FIG. 4. In any case, the data points and empirical relationship can be obtained and stored in the wellsite computer before LWD operations begin.

Figure 5:
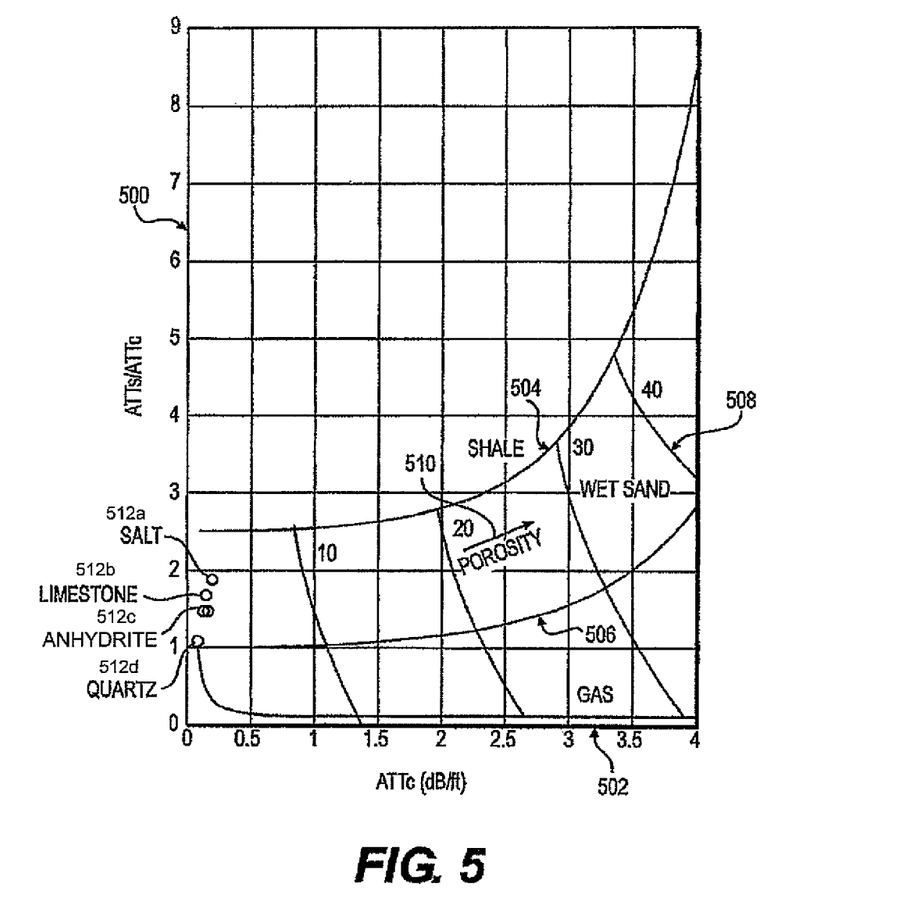
FIG. 5 is an example of an empirical lithology map with the two axes representing compression wave attenuation (ATTc) and the ratio of shear wave attenuation and compression wave attenuation (ATTs/ATTc). The map shows curves corresponding to selected values of porosity and curves corresponding to shale and wet sand formations.

FIG. 5 illustrates an empirical lithology map based on compressional and shear attenuation measurements, analogous to the more traditional lithology map based on compressional and shear slowness measurements. Known field data are used to obtain the cross plot of the shear to compressional attenuation ratio, ATTs/ATTc 500, versus compressional attenuation ATTc 502. Associated data concerning rock type, porosity, fluid contents, and saturation are recorded for each data pair (ATTc, ATTs/ATTc) collected. Data are collected for a wide range of reservoir rock types with various porosity and saturation. The data collected may be either global or localized, as appropriate to the intended application. Global data would be most suitable for an unknown exploratory field; if localized data is available for the drill site area, it would be more suitable to use that data.

The data pairs (ATTc, ATTs/ATTc) associated with a certain rock type, porosity, fluid content, or saturation will tend to cluster in a specific area or along a specific curve in the cross plot. For example, in FIG. 5, the data points obtained from a shale formation will tend to lie along the curve 504. Formations with wet sand will tend to lie along the curve 506. Formations with porosity Φ=40 will tend to cluster at the level marked by the curve 508. Similar "isobars" for porosity are shown for Φ 10, 20, and 40, and the general direction of increasing porosity is indicated by an arrow 510. Along a line of constant porosity such as 508, the water content of the formation tends to increase as one moves upward from the bottom edge of the graph toward the wet sand curve; the gas content of the formation tends to increase as one moves in the opposite direction. Formations characterized as salt, tight limestone, anhydrite, and quartz tend to cluster in the lower left hand corner of the map and are shown as circles 512a, 512b, 512c, 512d, respectively. Empirical maps like those in FIG. 5 can be obtained and stored in the wellsite computer before LWD operations begin.

Figure 6:
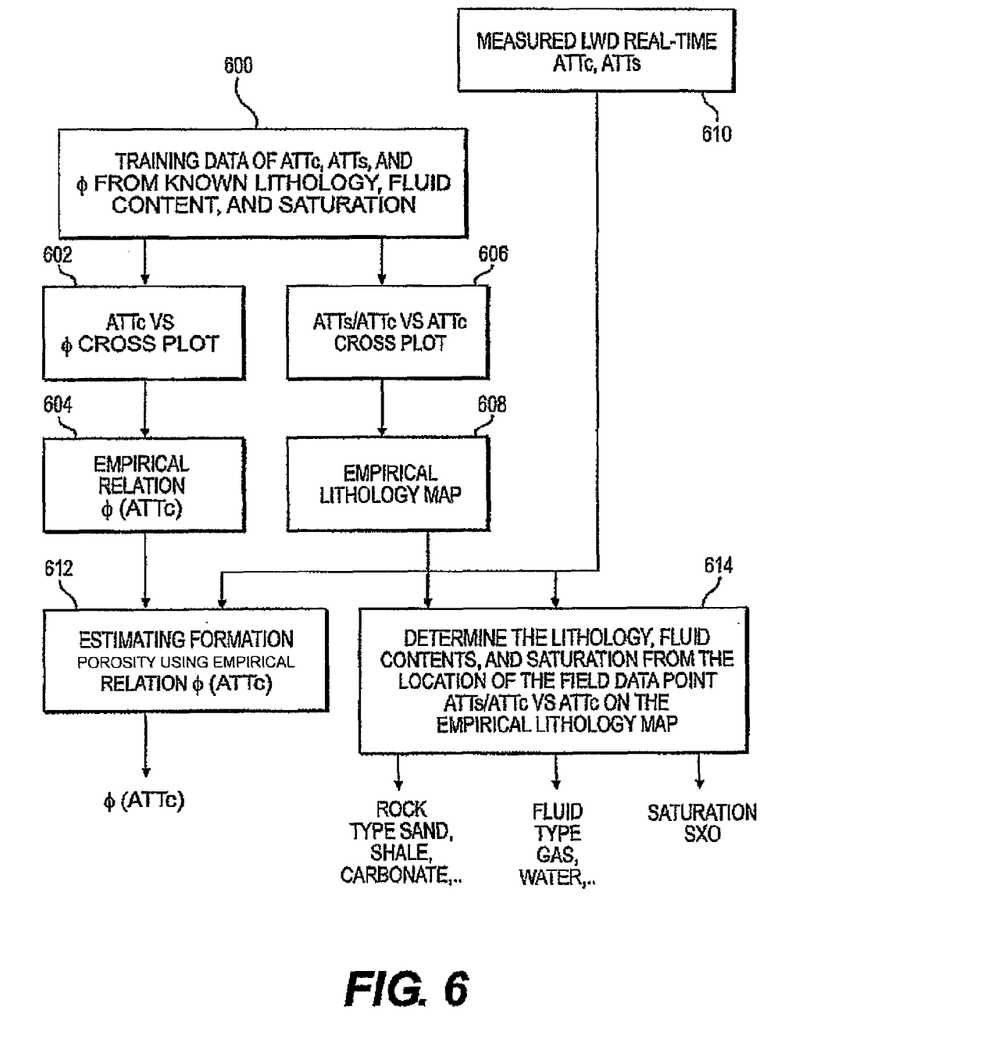
FIG. 6 is a flow diagram for real time LWD determination of porosity, rock type, fluid content and saturation based on the empirical relationship in FIG. 4, the empirical lithology map in FIG. 5 and actual LWD measurements of ATTc and ATTs.

FIG. 6 is a flow chart for processing algorithm characterizing the invention. Box 600 contains the experimental or training data required to develop the empirical relationship between ATTc and porosity Φ, as illustrated in FIG. 4, and the empirical lithology map, as illustrated in FIG. 5. The data needed for the cross plot of ATTc and Φ is passed to box 602. The cross plot featuring an array of data points, as illustrated by the dots 404 in FIG. 4. The cross plot is passed to box 604 where an appropriate curve-fitting algorithm is used to construct the empirical relationship between ATTc and Φ, as illustrated by the line 406 in FIG. 4. Activities in boxes 600, 602, 604 will usually be performed before LWD operations begin. Measured real-time LWD measurements of ATTc from box 610 are used with the empirical functional relationship Φ (ATTc) in box 612 to obtain an estimate of porosity Φ.

The data from Box 600, all of which is relevant to the construction of the empirical lithology map of FIG. 5 is passed to Box 606, where ATTs/ATTc is cross plotted against ATTc and the remainder of the related data is associated with the point (ATTc, ATTs/ATTc) on the grid. In Box 608, the data is analyzed to identify the specific areas or specific curves in the cross plot where the various properties or values associated with rock type, porosity, fluid content, or saturation will tend to cluster. Some of these curves and cluster points of interest are added to the cross plot to give an empirical lithology map. Measured real-time LWD measurements of ATTc and the ratio of ATTs/ATTc derived from box 610 are used with the empirical lithology map in Box 608 to obtain estimates of rock type, fluid type, porosity, and saturation.

The various aspects of the invention were chosen and described in order to best explain principles of the invention and its practical applications. The preceding description is intended to enable those of skill in the art to best utilize the invention in various embodiments and aspects and with modifications as are suited to the particular use contemplated. It is intended that the scope of the invention be defined by the following claims.

What is claimed is:

1. A method for estimating porosity of a formation, comprising:
    determining a plot of a plurality of porosity values versus attenuation attributes of sonic compression waves for a plurality of reservoir rocks with a plurality of porosities;
    applying a curve fitting algorithm to said plot to establish an empirical relationship between only the attenuation attribute of compression and porosity, wherein the empirical relationship is represented by an empirical model; and
    monitoring a sonic waveform signal of compression using a borehole logging while drilling system, the monitoring comprising:
        measuring attenuation attributes of compression waves in real time by a logging while drilling process utilizing the borehole logging while drilling system; and
        predicting the porosity of a formation from the established empirical relationship of the attenuation attribute of compression versus porosity by applying the logging while drilling measured compressional wave attenuation values to the empirical model to predict porosity of a formation on a real time basis.

2. The method for estimating porosity of a formation, as defined in claim 1 wherein:
    said step of determining a plot of a plurality of porosity values versus attenuation attributes of sonic compression waves for a plurality of reservoir rocks with a plurality of porosities uses global data.

3. The method for estimating porosity of a formation, as defined in claim 1 wherein:
    said step of determining a plot of a plurality of porosity values versus attenuation attributes of sonic compression waves for a plurality of reservoir rocks with a plurality of porosities uses local data.

4. The method for estimating porosity of a formation, as defined in claim 1 wherein:
    said empirical model is stored on a well site computer before logging while drilling operations are performed.

5. A method for estimating porosity of a formation, comprising:
- determining a plot of shear attenuation (ATTs) to compressional attenuation (ATTc) ratio versus compressional attenuation (ATTc) for a plurality of formation rock types;
- applying a curve fitting algorithm to said plot to establish an empirical relationship between only the attenuation attribute of compression and porosity and establishing empirical curves of porosity on said plot of (ATTs/ATTc) versus (ATTc); and
- monitoring sonic waveform signals of compression and shear using a borehole logging while drilling system, the monitoring comprising:
  - measuring (ATTc) and (ATTs) during use of the borehole logging while drilling system to conduct logging while drilling operations; and
  - predicting the porosity of formation rock from the established empirical curves of (ATTs/ATTc) versus (ATTc) on a real time basis from measured values of (ATTs) and (ATTc) during the logging while drilling operation.

6. The method for estimating porosity of a formation as defined in claim 5 and further comprising the steps of:
- determining empirical data for borehole formation lithology.

7. The method for estimating porosity of a formation as defined in claim 6 and further comprising the steps of:
- predicting the lithology of formation rock from the established empirical curves of (ATTs/ATTc) versus (ATTc) on a real time basis from measured values of (ATTs) and (ATTc) during the logging while drilling operation.

8. The method for estimating porosity of a formation as defined in claim 6 wherein:
- said step of determining a plot of (ATTs/ATTc) versus (ATTc) for a plurality of rock types uses global data.

9. The A method for estimating porosity of a formation as defined in claim 6 wherein:
- said step of determining a plot of (ATTs/ATTc) versus (ATTc) for a plurality of rock types uses local data.

10. The method for estimating porosity of a formation as defined in claim 6 wherein:
- said empirical curves between (ATTs/ATTc) versus (ATTc) are stored on a well site computer before logging while drilling operations are performed.

* * * * *